INVENTOR.
W. B. WHITNEY
BY Young and Quigg
ATTORNEYS

United States Patent Office 3,301,773
Patented Jan. 31, 1967

3,301,773
HYDRAZINIUM AMALGAMS AND PRODUCTION OF CONCENTRATED HYDRAZINE THEREFROM
William B. Whitney, Bartlesville, Okla., assignor to Phillips Petroleum Company, a corporation of Delaware
Filed May 27, 1963, Ser. No. 283,434
13 Claims. (Cl. 204—101)

This invention relates to hydrazinium amalgams and the production of concentrated hydrazine therefrom. In one aspect this invention relates to hydrazinium amalgams. In another aspect this invention relates to a method for the production of concentrated hydrazine. In another aspect this invention relates to combinations of apparatus for the production of concentrated hydrazine.

In recent years considerable interest has developed in the use of hydrazine, both as a high energy rocket fuel and as a raw material for the synthesis of other chemicals. The use of hydrazine as a high energy rocket fuel has stimulated interest in its use as a raw material. Compounds useful as drugs, germicides, herbicides, insecticides, dyes, textile treating agents and other uses have been synthesized from hydrazine. These developments in the uses of hydrazine have stimulated interest in improved methods for the production of concentrated hydrazine, particularly essentially anhydrous hydrazine.

Methods for the production of hydrazine can be divided roughly into three categories: (1) by the partial oxidation of ammonia or ammonia derivatives, e.g., urea, (2) methods involving the decomposition of ammonia, and (3) by the reduction of compounds containing a N—N linkage. Many of these methods do not yield a concentrated hydrazine or an essentially anhydrous hydrazine. In many of said methods an aqueous solution of hydrazine is obtained, and which sometimes is contaminated with hydrazine salts. Hydrazine forms an azeotropic mixture with water which has a boiling point of 120.1° C. and which contains 71.5 weight percent $N_2H_4$. Thus, aqueous solutions of hydrazine cannot be concentrated by ordinary fractional distillation to contain more than 71.5 weight percent $N_2H_4$. Anhydrous hydrazine is presently prepared from aqueous solutions of hydrazine by first obtaining therefrom the said azeotropic mixture and then refluxing said azeotropic mixture with such dehydrating agents as potassium hydroxide or sodium hydroxide followed by distillation in an inert atmosphere or under vacuum. Thus, even though aqueous solutions of hydrazine, sometimes referred to as hydrazine hydrate ($N_2H_4 \cdot H_2O$) or hydrazine hydroxide ($N_2H_5OH$), and hydrazine salts are relatively easy to prepare, there is still today no really convenient and economical method for the production of concentrated hydrazines containing more than 71.5 weight percent $N_2H_4$, and particularly an essentially anhydrous hydrazine containing at least 99 weight percent $N_2H_4$. Such a method, using aqueous solutions of hydrazine or aqueous solutions of hydrazine salts as the starting material, would be a valuable contribution to the art.

The present invention provides such a method. I have discovered that hydrazinium amalgams can be prepared by electrolysis of an electrolyte containing hydrazinium ions in an electrolytic cell provided with a liquid mercury cathode. I have further discovered that said hydrazinium amalgams can be readily decomposed into hydrogen, mercury, and a concentrated hydrazine containing more than 71.5 weight percent $N_2H_4$. Thus, broadly speaking, the present invention resides in a hydrazinium amalgam produced by subjecting an electrolyte containing hydrazinium ions to electrolysis in an electrolytic cell provided with a liquid mercury cathode; a process for producing a concentrated hydrazine containing more than 71.5 weight percent $N_2H_4$ which comprises decomposing said amalgam to obtain said concentrated hydrazine; and combinations of apparatus for producing said amalgam and said concentrated hydrazine.

Thus, an object of this invention is to provide a hydrazinium amalgam. Another object of this invention is to provide a process for producing a concentrated hydrazine containing more than 71.5 weight percent $N_2H_4$. Another object of this invention is to provide a process for producing an essentially anhydrous hydrazine containing at least 99 weight percent $N_2H_4$. Another object of this invention is to provide combinations of apparatus which can be employed to attain said previously mentioned objects. Other aspects, objects, and advantages of this invention will be apparent to those skilled in the art in view of this disclosure.

Thus, according to the invention, there is provided a hydrazinium amalgam produced by subjecting an electrolyte containing hydrazinium ions to electrolysis in an electrolytic cell provided with a liquid mercury cathode.

Further according to the invention, there is provided a process for producing a concentrated hydrazine containing more than 71.5 weight percent $N_2H_4$, which process comprises: electrolyzing an aqueous electrolyte containing hydrazinium ions in an electrolytic cell provided with a liquid mercury cathode, whereby hydrazinium ions are discharged at said cathode and amalgamated with said mercury to form a hyrazinium amalgam; separating said amalgam from said mercury cathode and said electrolyte; and decomposing said amalgam into hydrogen, mercury, and said concentrated hydrazine.

Still further according to the invention, there are provided combinations of apparatus which can be employed for producing said hydrazinium amalgam and/or producing said concentrated hydrazines.

Amalgams of mercury with numerous metals are well known. These amalgams are commonly formed by subjecting an electrolyte solution containing the desired metal ion to electrolysis in an electrolytic cell provided with a liquid mercury cathode. Aqueous solutions of the corresponding salts or hydroxides are commonly used as the electrolyte solutions. The metal ion discharged at the cathode is absorbed and/or amalgamated in the mercury of the mercury cathode, thus forming a metal amalgam. In continuous processes wherein the electrolyte is continuously replenished and wherein the mercury in the cathode chamber is also continuously replenished, said amalgams can be drawn off continuously as they are formed.

Amalgams prepared in electrolytic cells commonly contain from about 0.1 to about 1 percent by weight of the amalgamated material. The amount of the amalgamated material in the amalgam will depend upon the operating conditions employed in the electrolytic cell. However, as the concentration of the amalgamated material in the amalgam increases, the efficiency of the cell decreases. Said cells can be operated to produce higher concentrations of amalgamated material in the amalgam but when so operated the efficiency materially decreases and there is a tendency for the amalgam to solidify. Operating conditions for electrolytic cells used in the production of metal amalgams are well known to those skilled in the art. For example, see U.S. Patent 2,829,950, issued April 8, 1958, to G. L. Cunningham. I have discovered that hydrazinium amalgams can be prepared in the same type of electrolytic cells and under substantially the same conditions, with the exception of the temperature in the cell as discussed hereinafter, as said metal amalgams. Thus, insofar as this invention is concerned, said cells can be operated under any suitable conditions and the invention is not limited to any particular conditions for the operation of said cells.

When the concentration of amalgamated material in an amalgam is expressed in terms of weight percent, the values appear to be low. Actually, however, the mol fraction value is much higher when one considers the differences in molecular weight of the amalgamated material and the mercury in the amalgam. For example, a 1 weight percent amalgam prepared from $N_2H_5^+$ ion contains about 6 mol percent of $N_2H_5^+$. Hydrazinium amalgams of any suitable concentration can be employed in the practice of the invention.

Electrolytes used in the practice of the invention are aqueous solutions of hydrazine and aqueous solutions of hydrazine salts. Aqueous solutions of hydrazine are the presently preferred electrolytes. Hydrazine is souble in all proportions in water and in aqueous solution is characterized by the presence of the hydrazinium ion $N_2H_5^+$ which upon being discharged at a liquid mercury cathode in an electrolytic cell is absorbed and/or amalgamated by the mercury in said cathode. Examination of the melting point diagram for the system $N_2H_4$—$H_2O$ shows that hydrazine forms two eutectic mixtures. The hydrazine-rich eutectic contains 69 weight percent $N_2H_4$ and has a melting point of $-54°$ C. Hydrazine forms the monohydrate $N_2H_4 \cdot H_2O$ having a melting point of $-51.7°$ C. The terms "hydrazine hydrate" and "hydrazine hydroxide" (the latter can be written as $N_2H_5OH$) are sometimes employed interchangeably to refer to aqueous solutions of hydrazine. However, for the purposes of this application, it is preferred to reserve said term "hydrazine hydrate" for said monohydrate having a melting point of $-51.7°$ C., because said monohydrate does not exist in the liquid state. Also, for the purpose of this application, the terms "aqueous solution of hydrazine" and "hydrazine hydroxide" are used interchangeably and are intended to refer to all concentrations of solutions of hydrazine and water.

Hydrazine forms two series of salts which can be represented by the formulas $N_2H_4 \cdot HX$ and $N_2H_4 \cdot 2HX$ where X represents the acid anion. Said salts are water soluble and in aqueous solution are characterized by the presence of $N_2H_5^+$ and $N_2H_6^{++}$ ions, respectively. In accordance with the definition given on page 417 of Hackh's Chemical Dictionary, Third Edition (1944), the term "hydrazinium" is employed to refer to each of said $N_2H_5^+$ and $N_2H_6^{++}$ ions. Thus, herein and in the claims, unless otherwise specified, the term "hydrazinium" is employed generically and reads on each of said $N_2H_5^+$ and $N_2H_6^{++}$ ions. Similarly, herein and in the claims, unless otherwise specified, the term "hydrazinium amalgam" is employed generically and reads on each of the amalgams obtained when the $N_2H_5^+$ ion is discharged at a mercury cathode and amalgamated with the mercury therein, and the amalgams obtained when the $N_2H_6^{++}$ ion is discharged at a mercury cathode and amalgamated with the mercury therein.

Examples of said hydrazine salts which can be used in the practice of the invention include, among others, the following: hydrazine monohydrochloride, hydrazine dihydrochloride, hydrazine mononitrate, hydrazine dinitrate, hydrazine monosulfate, and hydrazine disulfate.

Electrolytes of any suitable concentration can be used in the practice of the invention. The invention is applicable to the concentration of aqueous solutions of hydrazine of any starting concentration. Thus, when using an aqueous solution of hydrazine as the electrolyte, said solution can have any concentration ranging from dilute solutions, e.g., 10 weight percent or less $N_2H_4$ to concentrated solutions, e.g., 90 weight percent or more $N_2H_4$. As will be evident to those skilled in the art in view of this disclosure as a whole, the actual concentration of the aqueous solution of hydrazine used as an electrolyte will be dictated by economic considerations, the freezing point of said solution, the particular type and size of electrolytic cell being employed, and the temperature at which it is desired to operate said cell. Aqueous solutions of hydrazine having a $N_2H_4$ concentration within the range of from 25 to 80 percent are presently preferred. Since hydrazine forms an azeotropic mixture containing 71.5 weight percent $N_2H_4$, the invention finds its greatest application in concentrating aqueous solutions of hydrazine having approximately this concentration. Thus, a presently more preferred electrolyte is an aqueous solution of hydrazine having a $N_2H_4$ concentration within the range of from 65 to 75 weight percent.

When aqueous solutions of hydrazine salts are used as electrolytes in the practice of the invention, said electrolytes can have any suitable concentrations of the salt. The choice of the actual concentration used will depend upon the particular hydrazine salt, the freezing point of the solution of said salt, the temperature at which it is desired to operate the electrolytic cell, and the type and size of said cell. It is frequently preferred that the electrolyte be a substantially saturated solution of the hydrazine salt being used, although less concentrated solutions can be and are often used. Thus, generally speaking, the preferred concentration for aqueous solutions of hydrazine salts used as electrolytes will usually be in the range of from 50 percent of saturated to substantially saturated solutions.

Figure 1:
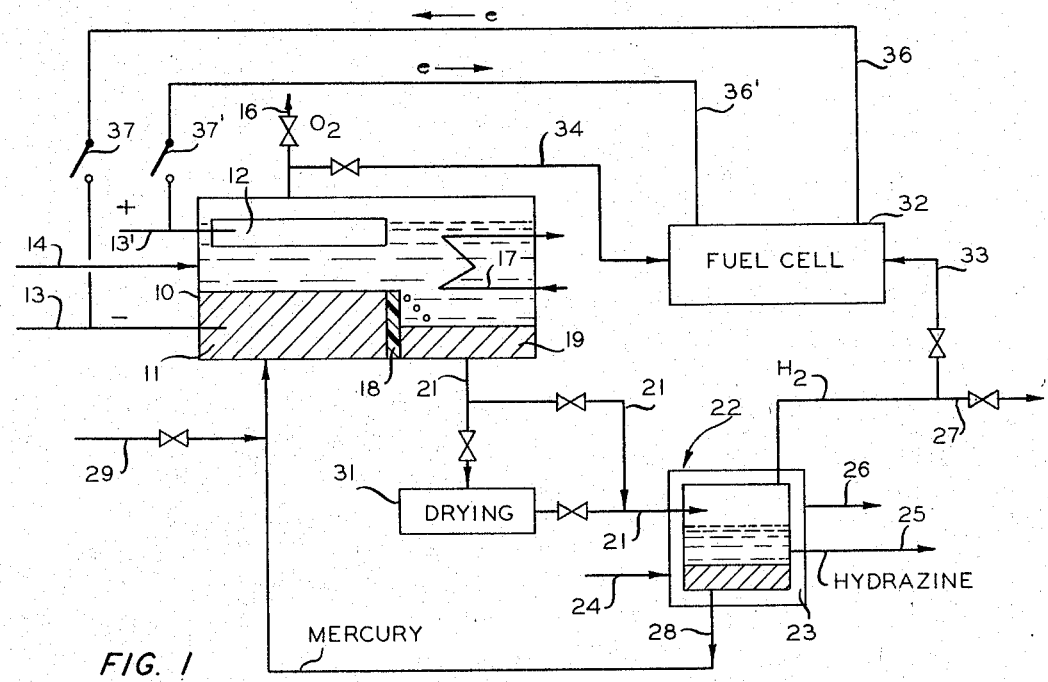
FIGURE 1 is a diagrammatic flow sheet illustrating the production of a hydrazinium amalgam and a concentrated hydrazine in accordance with the invention and also a schematic representation of combinations of apparatus which can be employed in the practice of the invention.

Referring now to said drawings, wherein like reference numerals are employed to designate like elements, the invention will be more fully explained. It will be understood that said drawings are diagrammatic in nature and that many valves, pressure gauges, pumps, etc., not necessary for explaining the invention to those skilled in the art, have been omitted so as to simplify said drawings. In FIGURE 1 there is shown an electrolytic cell 10 provided with a liquid mercury cathode means 11. Said cathode means can be any suitable form of liquid mercury cathode known to the art. Said cell is also provided with a suitable anode means 12 which can be any suitable type of anode known to the art. Materials commonly used for such anodes include graphite and platinum. Said cathode and said anode are connected to a suitable source of direct current by means of the lead wires 13 and 13', and are ordinarily operated at current densities in the range of 0.01 to 3, preferably 0.1 to 2, amperes per square inch. A conduit 14 is provided for introducing and replenishing the electrolyte solution in said cell. A suitable conduit means 16 is provided for removing materials such as oxygen or chlorine which are liberated at the anode. Some hydrogen will be liberated at the cathode during the operation of the cell and this can also be removed through conduit 16 or, if desired, other suitable means can be provided for removing the hydrogen separately. A coil 17 through which heating fluid or refrigerating fluid can be passed is provided within said cell for controlling the temperature of the electrolyte therein. Any suitable heating fluid, such as steam, and any suitable refrigerating fluid, such as Freon or liquefied petroleum gases, can be circulated through said coil 17. It is also within the scope of the invention to use any other suitable means for heating or cooling said electrolyte.

Means are provided within said cell 10 for separating the amalgam formed at the cathode from the mercury comprising said cathode. As here illustrated, said separating means comprises a weir 18 which defines one wall or boundary of the mercury cathode. When the cell is operated in a continuous manner, the amalgam formed at the cathode is caused to overflow said weir by the make-up mercury entering the cathode chamber and collects as a pool of amalgam 19 in one compartment of the cell. Said weir 18 can be fabricated from a suitable plastic or other non-conducting material as shown. It will be understood that the walls of said cell 10 are also fabricated of a suitable non-conducting material.

A first conduit means 21 is connected to said cell 10 for withdrawing amalgam therefrom and passing same to decomposing vessel 22. Said decomposing vessel 22 can be any suitable type of vessel or other means wherein said amalgam can be either heated or cooled. As here illustrated, said decomposing vessel 22 comprises a jacketed chamber provided with a jacket 23 through which heating fluid or refrigerating fluid can be passed by means of conduits 24 and 26. A conduit 27 connecting with the interior of said decomposing vessel 22 is provided for withdrawing hydrogen therefrom. Another conduit 28 connects with the interior of said vessel 22 for withdrawing liquid mercury therefrom and returning same to said mercury cathode 11. Conduit 29 connects with said conduit 28 and is provided for introducing make-up mercury, as required. Conduit 25 connects with the interior of said vessel 22 and is provided for withdrawing concentrated hydrazine therefrom.

In many instances, since the amalgams are preferably withdrawn from the bottom of the pool of amalgam 19 which collects in one compartment of cell 10, the amalgam will be sufficiently dry to permit direct passage through conduit means 21 to said decomposing vessel 22. However, if desired or necessary, a suitable drying or water removal means 31 can be disposed in said conduit means 21 by means of the valve and bypass arrangement shown. Said drying or water removal means can comprise any suitable means for removing moisture from the amalgam. For example, said means 31 can comprise a centrifuge.

In one embodiment of the invention, a fuel cell 32 is employed in combination with said electrolytic cell 10 to supply at least a portion of the electric current to said electrolytic cell 10. In this embodiment of the invention hydrogen is passed from conduit 27 via conduit 33 into said fuel cell 32 and oxygen is passed from conduit 16 via conduit 34 into said fuel cell 32. Suitable electrical conduit means 36 and 36' having switches 37 and 37' therein and connected to lead wires 13 and 13', respectively, are provided for establishing an electrical circuit between said electrolytic cell 10 and said fuel cell 32. Said fuel cell 32 per se forms no part of the instant invention except when employed in combination with other elements of apparatus and/or steps in the methods of the invention. Thus, said fuel cell can be any suitable type of fuel cell known to the art. Examples of fuel cells include those described on pages 355–376 of Kirk-Othmer "Encyclopedia of Chemical Technology," Second Supplement Volume, Interscience Encyclopedia Inc., New York, (1960).

In the operation of the apparatus illustrated in FIGURE 1, a suitable electrolyte, such as an aqueous solution of hydrazine, is introduced into cell 10 via conduit 14. Current is then applied to cathode 11 and anode 12 in conventional manner and a hydrazinium amalgam forms at said cathode 11. When operating in a continuous manner, said amalgam, being less dense than the mercury and of a soft, buttery consistency, floats on the mercury and overflows weir 18 into the amalgam compartment as shown. In has been found during the operation of such cells in accordance with the invention that maintaining the temperature of the electrolyte below room temperature renders the amalgam more stable. Thus, in the practice of the invention, the temperature of the electrolyte in cell 10 is preferably not permitted to increase above 30° C. and is more preferably maintained below 20° C. At temperatures above 30° C. the rate of decomposition of the amalgam into hydrazine, hydrogen and mercury becomes significant. I have also found that freezing of the amalgam to the solid state will cause same to decompose into hydrazine, mercury and hydrogen. Thus, the temperature of electrolysis can be stated to be within the range of from −39 to +30, preferably −35 to +20° C.

Amalgam is withdrawn from cell 10 via conduit means 21, either with or without drying as desired or necessary, and passed into decomposing vessel 22. In said vessel 22 the amalgam is caused to decompose into hydrazine, mercury and hydrogen. As indicated above, the hydrazinium amalgams are unstable at temperatures above +30° C., and when frozen to the solid state. Thus, the preferred temperature range for the decomposition of said hydrazinium amalgams can be said to be below −39° C. and above +30° C., or outside the range of from −39 to +30° C. The hydrazine liberated in decomposing vessel 22 can be withdrawn via conduit 25 for use or storage as desired. Said liberated hydrazine is a concentrated hydrazine having a $N_2H_4$ content of more than 71.5 weight percent. Since the hydrazinium amalgam is withdrawn from the bottom of the amalgam compartment in cell 10, the only moisture present in said amalgam will be mechanically entrained moisture. It is easy to maintain this mechanically entrained moisture at a very low level. Indeed, in almost all instances, by reasonably careful operation of the cell and maintaining a level of amalgam therein, one can withdraw an amalgam having a sufficiently low moisture content such that the amalgam when decomposed will yield an essentially anhydrous hydrazine having a $N_2H_4$ content of at least 99 weight percent. However, if it is desired to produce an absolutely anhydrous hydrazine the amalgam withdrawn from cell 10 can be passed through drying or water removal means 31 to remove the last traces of moisture therefrom. In such instances, the hydrazine liberated in decomposing vessel 22 will have a $N_2H_4$ content of 100 weight percent.

Figure 2:
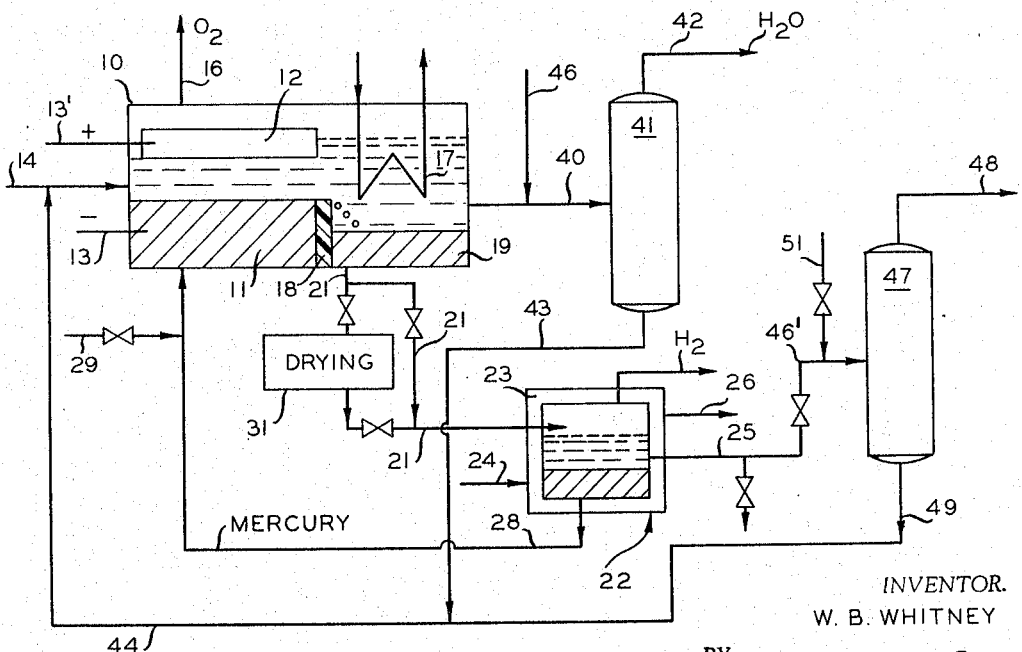
FIGURE 2 is a diagrammatic flow sheet illustrating other processes for producing a concentrated hydrazine in accordance with the invention and a schematic representation of other combinations of apparatus which can be employed in the practice of the invention.

Referring now to FIGURE 2, there are illustrated combinations of apparatus in which the methods of the invention can be carried out to concentrate an aqueous solution of hydrazine having any $N_2H_4$ content to any higher $N_2H_4$ content, including an essentially anhydrous hydrazine having a $N_2H_4$ content of at least 99 weight percent, or an anhydrous hydrazine. Since in the operation of electrolytic cell 10 the electrolyte is depleted by the discharge and amalgamation of $N_2H_5^+$ ions at the mercury cathode, it is desirable to replenish or regenerate said electrolyte. For each mol of $N_2H_5^+$ ion which is removed, one-half mol of water is destroyed. Said depleted electrolyte can be regenerated by withdrawing same via conduit 40 and introducing it into a first fractionation zone represented by fractionator 41 and fractionating same to remove water therefrom and recover a stream of aqueous hydrazine having a composition essentially that of the hydrazine-water azeotrope or containing at least 28.5 weight percent water. Said water is removed overhead via conduit 42 and said stream of essentially hydrazine-water azeotrope is removed via conduit 43 and introduced into conduit 44 for return to electrolytic cell 10 via conduit 14. If desired, make-up electrolyte can be supplied by introducing into conduit 40 via conduit 46 an aqueous solution of hydrazine having a $N_2H_4$ concentration equal to or less than 71.5 weight percent. While fractionation zone 41 has been illustrated as a single fractionator, it will be understood that said fractionation zone can comprise any suitable number of fractionators. It will also be understood that said fractionator 41 is supplied with suitable means for introducing heat thereto and suitable reflux means for removing heat therefrom so as to maintain fractionating conditions therein.

In another embodiment of the invention, and when it is desired to produce an anhydrous hydrazine having a $N_2H_4$ content of at least 99 weight percent, and when for any reason the hydrazine liberated in decomposing zone 22 contains less than 99 weight percent $N_2H_4$, said hydrazine from decomposing zone 22 can be passed via conduits 25 and 46' into a second fractionating zone, represented by fractionator 47. In said fractionator 47 said hydrazine is fractionated to recover therefrom a stream of essentially anhydrous hydrazine having a $N_2H_4$ content of at least 99 weight percent and a stream of aqueous hydrazine containing at least 28.5 weight percent water. Said essentially anhydrous hydrazine is removed via conduit 48 as a product of the process and said aqueous hydrazine is removed via conduit 49 and introduced into conduit 44 for introduction into cell 10 via conduit 14. If desired, a stream of aqueous hydrazine having a $N_2H_4$ concentration greater than 71.5 weight percent can be introduced via conduit 51 and 46' into said fractionator 47 as a portion of the charge thereto. It will be understood that said second fractionating zone 47, while illustrated as a single fractionator, can comprise any suitable number of fractionators. It will also be understood that said fractionator 47 is provided with suitable heat introduction means and suitable refluxing and heat removal means for maintaining fractionating conditions therein.

The following examples will serve to further illustrate the invention.

*Example I*

An aqueous solution of hydrazine having a $N_2H_4$ content of about 65 weight percent was electrolyzed at −30° C. employing an electrolytic cell provided with a liquid mercury cathode. The cathode before passage of any electrolytic current had a potential of +0.12 volt. After about two hours of continuous electrolysis at a current of 200 milliamps and a cathode potential of −1.34 volts, it was found that an open circuit cathode potential of −0.82 was obtained. The electrode potentials were measured against a calomel electrode (1 molar in KCl) but the values have been converted and are expressed with respect to a standard hydrogen half cell. The sign follows the European Convention. The concentrated amalgam was separated from the liquid mercury by straining the mixture through a 100-mesh nickel screen. The separated amalgam was pressed between filter paper to dry, and then placed in a bottle. On warming to room temperature, gas was evolved and liquid concentrated hydrazine was obtained floating on the mercury.

*Example II*

Another hydrazinium amalgam was produced as described in Example I. The total electrolyte and mercury cathode were cooled until the mercury solidified. Decomposition of the amalgam occurred as shown by the release of hydrogen gas in very fine bubbles when the mercury and amalgam had solidified.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A hydrazinium amalgam produced by subjecting an electrolyte containing hydrazinium ions to electrolysis in an electrolytic cell provided with a liquid mercury cathode to form said amalgam at said cathode, and separating said amalgam from said cathode and said electrolyte.

2. A process for producing a concentrated hydrazine containing more than 71.5 weight percent $N_2H_4$, which process comprises: producing a hydrazinium amalgam by electrolysis of an aqueous electrolyte containing hydrazinium ions in an electrolytic cell provided with a liquid mercury cathode; and decomposing said amalgam to recover said concentrated hydrazine therefrom.

3. A process for producing a concentrated hydrazine containing more than 71.5 weight percent $N_2H_4$, which process comprises: electrolyzing an aqueous electrolyte containing hydrazinium ions in an electrolytic cell provided with a liquid mercury cathode, whereby hydrazinium ions are discharged at said cathode and amalgamated with said mercury to form a hydrazinium amalgam; separating said amalgam from said mercury cathode and said electrolyte; and decomposing said amalgam into hydrogen, mercury, and said concentrated hydrazine.

4. A process for producing a concentrated hydrazine containing more than 71.5 weight percent $N_2H_4$, which process comprises: electrolyzing an aqueous electrolyte containing hydrazinium ions selected from the group consisting of $N_2H_5^+$, $N_2H_6^{++}$, and mixtures thereof, in an electrolytic cell provided with a liquid mercury cathode, whereby hydrazinium ions are discharged at said cathode and amalgamated with said mercury to form a hydrazinium amalgam; passing said amalgam from said cell into a decomposing zone; in said zone, subjecting said amalgam to a temperature at which it decomposes and decomposing same into said concentrated hydrazine, hydrogen, and mercury; and recovering said concentrated hydrazine from said decomposing zone.

5. A process for producing a concentrated hydrazine containing more than 71.5 weight percent $N_2H_4$, which process comprises: subjecting an electrolyte selected from the group consisting of (1) an aqueous solution of a hydrazine salt, (2) an aqueous solution of hydrazine, and (3) mixtures of said (1) and (2), to electrolysis in an electrolytic cell provided with a liquid mercury cathode, whereby an amalgam is formed at said cathode; removing said amalgam from said cell; subjecting said amalgam to a temperature outside the range of from −39 to +30° C. to decompose same into hydrogen, mercury and said concentrated hydrazine; and recovering said concentrated hydrazine.

6. A process according to claim 5 wherein said electrolyte is an aqueous solution of hydrazine.

7. A process for producing a concentrated hydrazine containing more than 71.5 weight percent $N_2H_4$, which process comprises: subjecting an aqueous solution of hydrazine containing less than 71.5 weight percent $N_2H_4$ to electrolysis at a temperature within the range of from −39 to +30° C. in an electrolytic cell provided with a liquid mercury cathode to form a hydrazinium amalgam at said cathode; removing said amalgam from said cell; subjecting said amalgam in a decomposing zone to a temperature outside the range of from −39 to +30° C. to decompose same into hydrogen, mercury, and said concentrated hydrazine; and recovering said concentrated hydrazine from said decomposing zone.

8. A process for producing an essentially anhydrous hydrazine containing at least 99 weight percent $N_2H_4$, which process comprises: electrolyzing an aqeuous electrolyte containing hydrazinium ions in an electrolytic cell provided with a liquid mercury cathode, whereby hydrazinium ions are discharged at said cathode and amalgamated with said mercury to form a hydrazinium amalgam; separating said amalgam from said mercury cathode and said electrolyte; and subjecting said separated amalgam to a temperature at which it decomposes and decomposing same into said essentially anhydrous hydrazine, hydrogen and mercury.

9. A process for producing an essentially anhydrous hydrazine containing at least 99 weight percent $N_2H_4$, which process comprises: subjecting an electrolyte selected from the group consisting of (1) an aqueous solution of a hydrazine salt, (2) an aqueous solution of hydrazine, and (3) mixtures of said (1) and said (2), to electrolysis in an electrolytic cell provided with a liquid mercury cathode to form an amalgam at said cathode; separating said amalgam from said mercury cathode and said electrolyte; subjecting said separated amalgam in a decomposing zone to a temperature outside the range of from −39 to +30° C. to decompose same into hydrogen, mercury and said essentially anhydrous hydrazine; and recovering said essentially anhydrous hydrazine from said decomposing zone.

10. A process for producing a concentrated hydrazine containing more than 71.5 weight percent $N_2H_4$, which process comprises: introducing an aqueous solution of hydrazine into an electrolytic cell provided with a liquid mercury cathode, said solution serving as electrolyte in said cell; subjecting said solution to electrolysis in said cell at a temperature within the range of from $-39$ to $+30°$ C. to form a hydrazinium amalgam at said cathode; removing said amalgam from said cell; subjecting said amalgam in a decomposing zone to a temperature outside the range of from $-39$ to $+30°$ C. to decompose same into hydrogen, mercury, and hydrazine; returning said mercury from said decomposing zone to said mercury cathode in said cell; passing depleted electrolyte solution from said cell to a first fractionation zone and therein fractionating same to remove water therefrom and recover a stream of substantially hydrazine-water azeotrope containing at least 28.5 weight percent water; returning said azeotrope stream to said cell; and recovering said hydrazine from said decomposing zone as said concentrated hydrazine.

11. A process for producing a concentrated hydrazine containing more than 71.5 weight percent $N_2H_4$, which process comprises: introducing an aqueous solution of hydrazine into an electrolytic cell provided with a liquid mercury cathode, said solution serving as electrolyte in said cell; subjecting said solution to electrolysis in said cell at a temperature within the range of from $-39$ to $+30°$ C. to form a hydrazinium amalgam at said cathode; removing said amalgam from said cell; subjecting said amalgam in a decomposing zone to a temperature outside the range of from $-39$ to $+30°$ C. to decompose same into hydrogen, mercury, and hydrazine; returning said mercury from said decomposing zone to said mercury cathode in said cell; introducing an aqueous solution containing not more than 71.5 weight percent of $N_2H_4$ into a first fractionation zone as a portion of the charge thereto; passing depleted electrolyte solution from said cell to said first fractionation zone as a portion of the charge thereto; in said first fractionation zone, fractionating the charge thereto to remove water therefrom and recover a stream of substantially hydrazine-water azeotrope containing at least 28.5 weight percent water; returning said azeotrope stream to said cell; and recovering said hydrazine from said decomposing zone as said concentrated hydrazine.

12. A process for producing an essentially anhydrous hydrazine containing at least 99 weight percent $N_2H_4$, which process comprises: introducing an aqueous solution of hydrazine into an electrolytic cell provided with a liquid mercury cathode, said solution serving as electrolyte in said cell; subjecting said solution to electrolysis in said cell at a temperature within the range of from $-39$ to $+30°$ C. to form a hydrazinium amalgam at said cathode; separating said amalgam from said electrolyte and said cathode; subjecting said amalgam in a decomposing zone to a temperature outside the range of from $-39$ to $+30°$ C. to decompose same into hydrogen, mercury, and hydrazine; returning said mercury from said decomposing zone to said mercury cathode in said cell; introducing an aqueous solution containing not more than 71.5 weight percent of $N_2H_4$ into a first fractionation zone as a portion of the charge thereto; passing depleted electrolyte solution from said cell to said first fractionation zone as a portion of the charge thereto; in said first fractionation zone, fractionating the charge thereto to remove water therefrom and recover a stream of substantially hydrazine-water azeotrope containing at least 28.5 weight percent water; returning said azeotrope stream to said cell; and recovering said hydrazine from said decomposing zone as said essentially anhydrous hydrazine.

13. A process for producing an essentially anhydrous hydrazine containing at least 99 weight percent $N_2H_4$, which process comprises: introducing an aqueous solution of hydrazine into an electrolytic cell provided with a liquid mercury cathode, said solution serving as electrolyte in said cell; subjecting said solution to electrolysis in said cell at a temperature within the range of from $-39$ to $+30°$ C. to form a hydrazinium amalgam at said cathode; removing said amalgam from said cell; subjecting said amalgam in a decomposing zone to a temperature outside the range of from $-39$ to $+30°$ C. to decompose same into hydrogen, mercury, and a concentrated hydrazine containing more than 71.5 weight percent $N_2H_4$; returning said mercury from said decomposing zone to said mercury cathode in said cell; introducing an aqueous solution containing not more than 71.5 weight percent of $N_2H_4$ into a first fractionation zone as a portion of the charge thereto; passing depleted electrolyte solution from said cell to said first fractionation zone as a portion of the charge thereto; in said first fractionation zone, fractionating the charge thereto to remove water therefrom and recover a stream of substantially hydrazine-water azeotrope; returning said azeotrope stream to said cell; passing said concentrated hydrazine from said decomposing zone to a second fractionation zone as a portion of the charge thereto; introducing an aqueous solution of hydrazine containing more than 71.5 weight percent $N_2H_4$ into said second fractionation zone as a portion of the charge thereto; in said second fractionation zone, fractionating the charge thereto to recover therefrom a stream of said essentially anhydrous hydrazine as product of the process and a stream of aqueous hydrazine containing at least 28.5 weight percent water; and passing said last-mentioned stream to said cell.

References Cited by the Examiner

UNITED STATES PATENTS

| | | | |
|---|---|---|---|
| 2,813,067 | 11/1957 | Stuart | 204—59 |
| 2,841,543 | 7/1958 | Haller | 204—59 |
| 2,970,095 | 1/1961 | Kandler et al. | 204—220 |
| 3,034,861 | 5/1962 | Pursley. | |

FOREIGN PATENTS

| | | |
|---|---|---|
| 1,051,820 | 3/1959 | Germany. |
| 119,348 | 4/1959 | Russia. |

OTHER REFERENCES

Chem. Abstracts, 27; 233⁶ (1933).

JOHN H. MACK, *Primary Examiner.*

MURRAY TILLMAN, *Examiner.*

L. G. WISE, H. FLOURNOY, *Assistant Examiners.*